United States Patent
Yu et al.

(10) Patent No.: US 10,288,043 B2
(45) Date of Patent: May 14, 2019

(54) WIND TURBINE CONDITION MONITORING METHOD AND SYSTEM

(71) Applicant: ABB Schweiz AG, Baden (CH)

(72) Inventors: Rongrong Yu, Beijing (CN); Niya Chen, Beijing (CN); Yao Chen, Beijing (CN)

(73) Assignee: ABB Schweiz AG, Baden (CH)

( * ) Notice: Subject to any disclaimer, the term of this patent is extended or adjusted under 35 U.S.C. 154(b) by 28 days.

(21) Appl. No.: 15/359,976

(22) Filed: Nov. 23, 2016

(65) Prior Publication Data

US 2017/0074250 A1 Mar. 16, 2017

Related U.S. Application Data

(63) Continuation of application No. PCT/CN2014/091425, filed on Nov. 18, 2014.

(51) Int. Cl.
  *F03D 17/00* (2016.01)
  *G06N 99/00* (2019.01)

(52) U.S. Cl.
  CPC .......... *F03D 17/00* (2016.05); *G06N 99/005* (2013.01); *F05B 2260/80* (2013.01); *F05B 2260/83* (2013.01); *F05B 2260/84* (2013.01)

(58) Field of Classification Search
  CPC .. F03D 17/00; F05B 2260/80; F05B 2260/83; G06N 99/005

(Continued)

(56) References Cited

U.S. PATENT DOCUMENTS 8,577,509 B2 * 11/2013 Ong .................... F03D 7/0292
  700/287
2005/0225090 A1 10/2005 Wobben
(Continued)

FOREIGN PATENT DOCUMENTS

CN 101825893 A 9/2010
CN 101872165 A 10/2010
(Continued)

OTHER PUBLICATIONS

State Intellectual Property Office of the P.R. China, International Search Report & Written Opinion issued in corresponding Application No. PCT/CN2014/091425, dated Jul. 15, 2015, 8 pp.
(Continued)

*Primary Examiner* — John H Le
(74) *Attorney, Agent, or Firm* — Taft Stettinius & Hollister LLP (57) ABSTRACT

The present application includes wind turbine condition monitoring method and system. The method includes: acquiring historical SCADA data, and wind turbine reports corresponding to the historical SCADA data; training an overall model for overall diagnosing the wind turbine, and training different individual models for analyzing different components of the wind turbine based on the historical SCADA data and the corresponding wind turbine report, by establishing relationship between the historical SCADA data and the wind turbine report; acquiring real time SCADA data, inputting the real time SCADA data to the trained overall model, obtaining the health condition of the wind turbine from the trained overall model, and performing individual diagnosing step if the trained overall model determines wind turbine as defective status; inputting the real time SCADA data to the trained individual model corresponding to the defective component, and obtaining the (Continued)

fault details of the defective component from the trained individual model corresponding to the defective component.

11 Claims, 3 Drawing Sheets

(58) Field of Classification Search
USPC ...... 702/183, 184, 185, 179; 416/1; 700/287
See application file for complete search history.

(56) References Cited

U.S. PATENT DOCUMENTS

| | | | |
|---|---|---|---|
| 2011/0018727 | A1 | 1/2011 | Bharadwaj et al. |
| 2011/0091321 | A1* | 4/2011 | Baker ............... F03D 7/047 416/1 |
| 2011/0313726 | A1 | 12/2011 | Parthasarathy et al. |
| 2012/0166000 | A1 | 6/2012 | Ellena et al. |

FOREIGN PATENT DOCUMENTS

| | | |
|---|---|---|
| CN | 201820121 U | 5/2011 |
| CN | 102156043 A | 8/2011 |
| CN | 102768115 A | 11/2012 |
| CN | 102878023 A | 1/2013 |
| CN | 103226651 A | 7/2013 |
| CN | 103234753 A | 8/2013 |
| CN | 103306893 A | 9/2013 |
| CN | 103439091 A | 12/2013 |
| CN | 103645052 A | 3/2014 |
| CN | 103761569 A | 4/2014 |
| CN | 103835882 A | 6/2014 |
| EP | 1323222 B1 | 11/2006 |
| EP | 2236821 A1 | 10/2010 |
| EP | 2514969 A2 | 10/2012 |
| EP | 2503146 B1 | 12/2013 |
| EP | 1752659 B1 | 3/2014 |
| KR | 100954090 B1 | 4/2010 |
| WO | 2009016020 A1 | 2/2009 |
| WO | 2011060424 A1 | 5/2011 |
| WO | 2012097819 A1 | 7/2012 |
| WO | 2013101958 A2 | 7/2013 |

OTHER PUBLICATIONS

Chinese Office Action, Chinese Patent Application No. 2018072701821960, dated Aug. 1, 2018, 19 pages.
Chinese Search Report, Chinese Patent Application No. 2018072701821960, dated Aug. 1, 2018, 4 pages.
Extended European Search Report, European Patent Application No. 14906626.8, dated Jun. 7, 2018, 6 pages.

* cited by examiner

WIND TURBINE CONDITION MONITORING METHOD AND SYSTEM

TECHNICAL FIELD

The present application relates to a wind turbine condition monitoring method and system.

BACKGROUND ART

Wind power has become the most popular renewable energy promising to displace traditional pollutive thermal power generation due to rich resources, mature technology, and zero emission. Global wind turbine installation had reached 318 GW by end of 2013. With rapid installation increase of wind farms, expensive O&M (operation and maintenance) cost and downtime electricity sale loss develop to be more and more pressing issues. Taking a 2 MW wind turbine as example, as evaluated by master thesis of KTH, about 248.4 kUSD annual cost arises, incl. 242.7 kUSD O&M cost and 5.7 kUSD electricity sale loss.

Under such environment, it's desired by the market to develop a kind of condition monitoring system (CMS) product which is able to real time detect the defects of wind turbine, analyze the fault type, and position the defective part, before the wind turbine evolves to real failure. Now the available products in market with such functionality are all based on additional sensors, e.g. vibration, acoustic, etc. These intrusive sensors not only largely increase the capital cost, but also cause recertification of wind turbines, both of which are undesirable for wind farm operators.

SUMMARY

Accordingly, one aspect of the present invention provides a wind turbine condition monitoring method, comprising the following steps:

historical data acquiring step: acquiring historical SCADA data, and wind turbine reports corresponding to the historical SCADA data, wherein the historical SCADA data covers operation data of the wind turbine, and wherein the wind turbine reports covers: health condition of wind turbine diagnosed as normal or defective status, and defective component with corresponding fault details if health condition of wind turbine is diagnosed as defective status;

model training step: training an overall model for overall diagnosing the wind turbine, and training different individual models for analyzing different components of the wind turbine based on the historical. SCADA data and the corresponding wind turbine report, by establishing relationship between the historical SCADA data and the wind turbine report;

overall diagnosing step: acquiring real time SCADA data, inputting the real time SCADA data to the trained overall model, obtaining the health condition of the wind turbine from the trained overall model, and performing individual diagnosing step if the trained overall model determines wind turbine as defective status;

individual diagnosing step: inputting the real time SCADA data to the trained individual model corresponding to the defective component, and obtaining the fault details of the defective component from the trained individual model corresponding to the defective component.

Preferably, the historical data acquiring step comprises:

acquiring historical SCADA data, and wind turbine reports corresponding to the historical SCADA data, wherein the historical SCADA data covers operation data of the wind turbine, and wherein the wind turbine reports covers: health condition of wind turbine diagnosed as normal or defective status, and defective component with corresponding fault details if health condition of wind turbine is diagnosed as defective status;

verifying the wind turbine report to identify which data section of the historical SCADA data is normal status and which data section of the historical SCADA data is defective status.

Preferably, the model training step comprises:
selecting overall data mining algorithm;
training an overall model for overall diagnosing the wind turbine with the overall data mining algorithm to establish relation between input and output of the overall model, input of the overall model is the historical SCADA data, output of the overall trained model is health condition of the wind turbine which includes normal and defective status, and defective component if health condition of the wind turbine is diagnosed as defective status;

selecting individual data mining algorithms for different components of the wind turbine;

training different individual models for analyzing different components of the wind turbine with the corresponding individual data mining algorithms to establish relation between input and output of the individual model, input of each individual model is the historical SCADA data, output of each individual model is the fault details for the individual component corresponding to the individual model if the individual component corresponding to the individual model is defective component.

Conveniently, the model training step comprises:
verifying the effectiveness of the overall model and individual models using the historical SCADA data.

Conveniently, the overall diagnosing step comprises:
acquiring real time SCADA data;
inputting the real time SCADA data to the trained overall model;
running the trained overall model to implement the overall data mining algorithm;
obtaining the health condition of the wind turbine from the trained overall model;
performing individual diagnosing step if the trained overall model determines wind turbine as defective status.

Conveniently, the individual diagnosing step comprises:
selecting the trained individual model corresponding to the defective component as the trained defective model;
inputting the real time SCADA data to the trained defective model;
running the trained defective model to implement the corresponding individual data mining algorithm;
obtaining the fault details of the defective component from the trained defective model.

Another aspect of the present invention provides a computer program comprising computer program code adapted to perform all of the steps of any one of the above when run on a computer.

A further aspect of the present invention provides a computer program according to the above, embodied on a computer-readable medium.

Another aspect of the present invention provides a wind turbine condition monitoring system, comprising the following modules:

historical data acquiring module, used for acquiring historical SCADA data, and wind turbine reports corresponding to the historical SCADA data, wherein the historical SCADA data covers operation data of the wind turbine, and wherein the wind turbine reports covers: health condition of wind turbine diagnosed as normal or defective status, and defective component with corresponding fault details if health condition of wind turbine is diagnosed as defective status;

model training module, used for training an overall model for overall diagnosing the wind turbine, and training different individual models for analyzing different components of the wind turbine based on the historical SCADA data and the corresponding wind turbine report, by establishing relationship between the historical SCADA data and the wind turbine report;

overall diagnosing module, used for acquiring real time SCADA data, inputting the real time SCADA data to the trained overall model, obtaining the health condition of the wind turbine from the trained overall model, and performing individual diagnosing module if the trained overall model determines wind turbine as defective status;

individual diagnosing module, used for inputting the real time SCADA data to the trained individual model corresponding to the defective component, and obtaining the fault details of the defective component from the trained individual model corresponding to the defective component.

Preferably, the historical data acquiring module comprises:

module used for acquiring historical SCADA data, and wind turbine reports corresponding to the historical SCADA data, wherein the historical SCADA data covers operation data of the wind turbine, and wherein the wind turbine reports covers: health condition of wind turbine diagnosed as normal or defective status, and defective component with corresponding fault details if health condition of wind turbine is diagnosed as defective status;

module used for verifying the wind turbine report to identify which data section of the historical SCADA data is normal status and which data section of the historical SCADA data is defective status.

Preferably, the model training module comprises:
module used for selecting overall data mining algorithm;
module used for training an overall model for overall diagnosing the wind turbine with the overall data mining algorithm to establish relation between input and output of the overall model, input of the overall model is the historical SCADA data, output of the overall trained model is health condition of the wind turbine which includes normal and defective status, and defective component if health condition of the wind turbine is diagnosed as defective status;

module used for selecting individual data mining algorithms for different components of the wind turbine;

module used for training different individual models for analyzing different components of the wind turbine with the corresponding individual data mining algorithms to establish relation between input and output of the individual model, input of each individual model is the historical SCADA data, output of each individual model is the fault details for the individual component corresponding to the individual model if the individual component corresponding to the individual model is defective component.

Conveniently, the model training module comprises:
module used for verifying the effectiveness of the overall model and individual models using the historical SCADA data.

Conveniently, the overall diagnosing module comprises:
module used for acquiring real time SCADA data;
module used for inputting the real time SCADA data to the trained overall model;
module used for running the trained overall model to implement the overall data mining algorithm;

module used for obtaining the health condition of the wind turbine from the trained overall model;
module used for performing individual diagnosing module if the trained overall model determines wind turbine as defective status.

Conveniently, the individual diagnosing module comprises:
module used for selecting the trained individual model corresponding to the defective component as the trained defective model;
module used for inputting the real time SCADA data to the trained defective model;
module used for running the trained defective model to implement the corresponding individual data mining algorithm;
module used for obtaining the fault details of the defective component from the trained defective model.

The present invention trained the overall model and the individual models with the historical SCADA data and the corresponding wind turbine fault information and input the real time SCADA data to the trained overall model for diagnosis and the trained individual models for analysis. The present invention proposes a type of hierarchical cost-effective remote level wind turbine condition monitoring method and system based on SCADA data. With the solution, the wind turbine operator is able to real time monitor the equipment condition, detect early faults and arrange proper predictive maintenance activities in advance. Compared with traditional intrusive sensor based technology, the present invention can benefit end-customer (wind turbine operator) in terms of saving installation of additional monitoring sensors due to pure SCADA-data-driven technology and accelerating algorithm execution efficiency due to hierarchical concept structure.

DETAILED DESCRIPTION OF THE EMBODIMENTS

Hereinafter, the present invention is further introduced in detail by the particular embodiments in combination with the figures.

Figure 1:
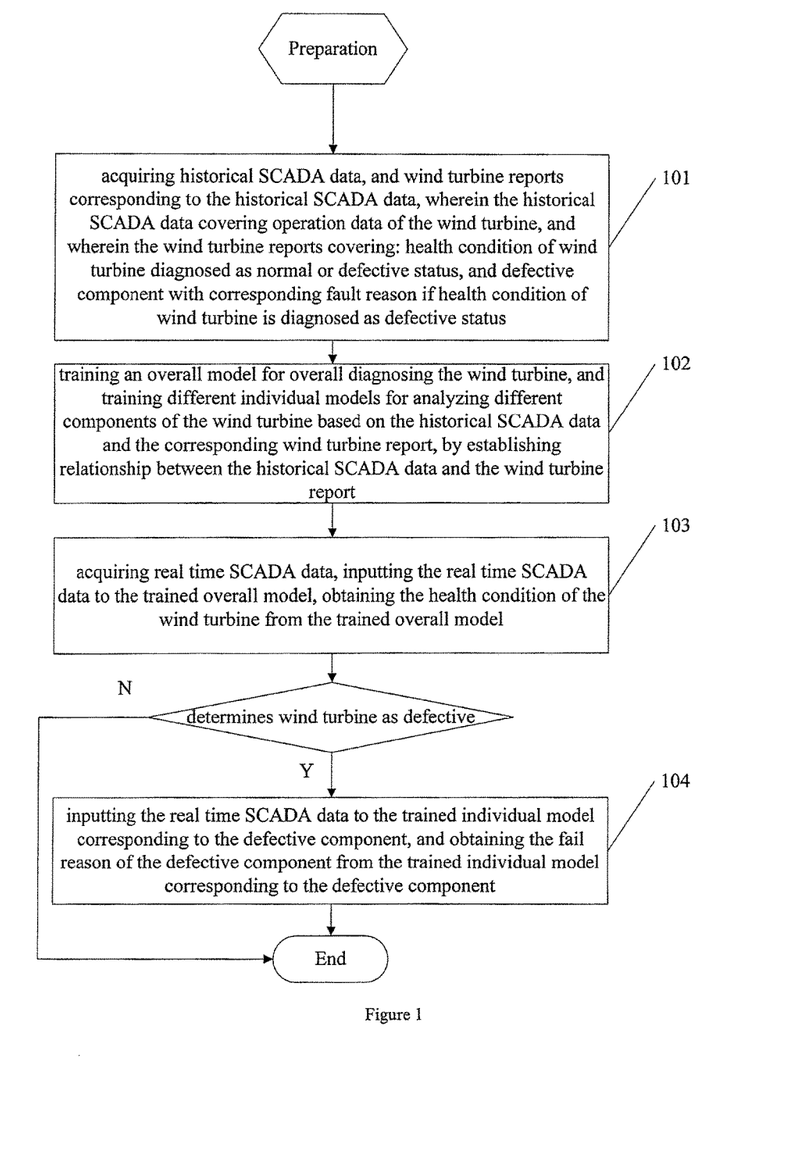
FIG. 1 shows a flow-process diagram illustrating a wind turbine condition monitoring method in accordance with the present invention.

FIG. 1 show a flow-process diagram illustrating a wind turbine condition monitoring method in accordance with the present invention, including the following steps:

step 101: acquiring historical SCADA data, and wind turbine reports corresponding to the historical SCADA data, wherein the historical SCADA data covers operation data of the wind turbine, and wherein the wind turbine reports covers: health condition of wind turbine diagnosed as normal or defective status, and defective component with corresponding fault details if health condition of wind turbine is diagnosed as defective status;

step 102: training an overall model for overall diagnosing the wind turbine, and training different individual models for analyzing different components of the wind turbine based on the historical SCADA data and the corresponding wind turbine report, by establishing relationship between the historical SCADA data and the wind turbine report;

step 103: acquiring real time SCADA data, inputting the real time SCADA data to the trained overall model, obtaining the health condition of the wind turbine from the trained overall model, and performing individual diagnosing step if the trained overall model determines wind turbine as defective status;

step 104: inputting the real time SCADA data to the trained individual model corresponding to the defective component, and obtaining the fault details of the defective component from the trained individual model corresponding to the defective component.

The SCADA data is collected from the Supervisory Control And Data Acquisition (SCADA) system. The SCADA system is a power automation monitoring system. It performs data collection, monitoring control and process control of the power system.

The present invention respectively trains the overall model and individual models in step 102 with the historical SCADA data and corresponding wind turbine report acquired in step 101. After training, the models established relationship between the historical SCADA data and the wind turbine report. The overall model and individual model can have good training performances with the historical SCADA data and corresponding wind turbine report. As the SCADA data includes the operation data, the historical SCADA data can reflect a variety of historical condition of wind turbines. And the wind turbine report includes health condition of the wind turbine, defective component and corresponding fault details. The health condition includes normal status and defective status. The defective component and corresponding fault details is only involved in the wind turbine report when the health condition of the wind turbine is diagnosed as defective status. In step 103 and 104, the real time SCADA data is inputted to the trained overall model and individual models. The trained overall model and individual model can get accurate health condition and fault details from the real time SCADA data, as the models have been trained with the historical SCADA data and the corresponding wind turbine report and can identify the normal status and defective status based on the SCADA data.

The present invention uses the SCADA data and training model to monitor the condition of the wind turbines, so it does not need to install additional sensors into wind turbines any more. In addition, the hierarchical concept structure can accelerate the processing efficiency of the wind turbines controller.

In one embodiment, the step 101 comprises:

acquiring historical SCADA data, and wind turbine reports corresponding to the historical SCADA data, wherein the historical SCADA data covers operation data of the wind turbine, and wherein the wind turbine reports covers: health condition of wind turbine diagnosed as normal or defective status, and defective component with corresponding fault details if health condition of wind turbine is diagnosed as defective status;

verifying the wind turbine report to identify which data section of the historical SCADA data is normal status and which data section of the historical SCADA data is defective status.

Dividing the historical SCADA data into normal status section and defective status section to facilitate the overall model and individual models making a correct health condition and fault details.

In one embodiment, the step 102 comprises:

selecting overall data mining algorithm;

training an overall model for overall diagnosing the wind turbine with the overall data mining algorithm to establish relation between input and output of the overall model, input of the overall model is the historical SCADA data, output of the overall trained model is health condition of the wind turbine which includes normal and defective status, and defective component if health condition of the wind turbine is diagnosed as defective status;

selecting individual data mining algorithms for different components of the wind turbine;

training different individual models for analyzing different components of the wind turbine with the corresponding individual data mining algorithms to establish relation between input and output of the individual model, input of each individual model is the historical SCADA data, output of each individual model is the fault details for the individual component corresponding to the individual model if the individual component corresponding to the individual model is defective component.

The overall data mining algorithm can be the same as or different with the individual data mining algorithms. The algorithms include neural network, support vector machine, principle component analysis, etc.

Both feature of individual algorithm and characteristics of collected data (e.g. data richness) should be considered during the algorithm selection. For different cases, the selected algorithm may be different.

Based on the historical SCADA data and the corresponding wind turbine report inputted as sample, training the overall model with the proper algorithm, the model can establish the relationship between the SCADA data and the wind turbine report. As the relationship established in model, inputting the real time SCADA data to the overall model can obtain the health condition as the output. And also, as the wind turbine report includes the defective component, so inputting the real time SCADA data to the overall model can obtain the defective component if the health condition is diagnosed as defective status.

By generalizing the wind turbine report with the historical SCADA data for the defective component, the individual model distinguishes the specific fault details of the defective component including fault type, fault location and fault severity. The individual model is trained to finally establish relationship between the SCADA data and the fault details of the defective component.

In one embodiment, the step 102 comprises:

verifying the effectiveness of the overall model and individual models using the historical SCADA data.

The effectiveness may be the detection ration. The model can be further optimized by verifying the effectiveness.

In one embodiment, the step 103 comprises:

acquiring real time SCADA data;

inputting the real time SCADA data to the trained overall model;

running the trained overall model to implement the overall data mining algorithm;

obtaining the health condition of the wind turbine from the trained overall model;

performing individual diagnosing step if the trained overall model determines wind turbine as defective status.

The overall data mining algorithm implemented in step 103 may be the same algorithm selected in step 102 to assure the reliability of the model.

In one embodiment, the step 104 comprises:

selecting the trained individual model corresponding to the defective component as the trained defective model;

inputting the real time SCADA data to the trained defective model;
running the trained defective model to implement the corresponding individual data mining algorithm;
obtaining the fault details of the defective component from the trained defective model.

Same as in step 103, the individual data mining algorithm implemented in step 104 may be the same algorithm selected in step 102 for the defective component.

Figure 2:
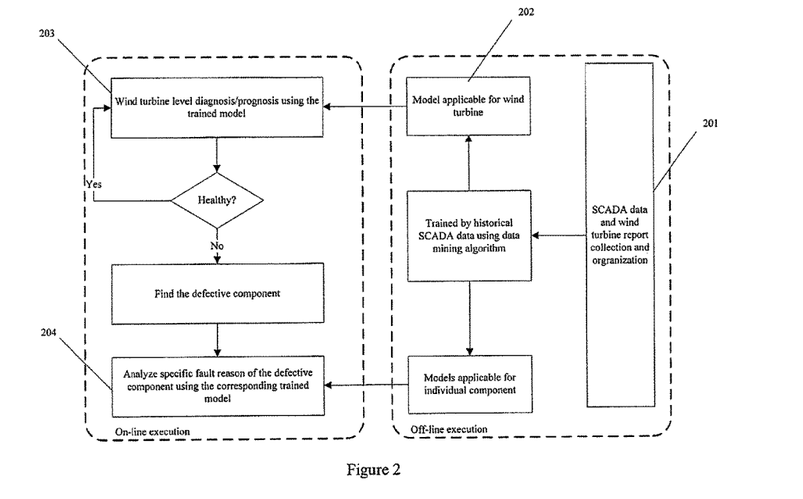
FIG. 2 shows a flow-process diagram illustrating the preferred embodiment of the present invention.

FIG. 2 shows a flow-process diagram illustrating the preferred embodiment of the present invention.

FIG. 2 comprises of two parts. Left side block represents real time diagnosis/prognosis; right side block represents model training process using SCADA data. More specifically, the whole concept can be implemented by the following steps:

Step 201: Collecting SCADA data and wind turbine report from real wind farm operation database incl.
  SCADA data covering operation data and the wind turbine report covering status (both normal and defective) of typical wind turbines in typical wind farms
  Verified wind turbine report corresponding to the SCADA data above specifying which data section is normal status and which is defective status
  Organize the data and fault information to proper format compatible for following data process
  Note that this step should be done off-line instead of on-line.

Step 202: Models using certain data mining algorithm based on the collected historical data
  Selecting proper data mining algorithm for model training, e.g. neural network, support vector machine, principle component analysis, etc. The algorithm selection should consider both feature of individual algorithm and characteristics of collected data (e.g. data richness). For different cases, the selected algorithm may be different.
  Using the selected data mining algorithm (e.g. neural network) to train an overall model applicable for wind turbine level diagnosis and prognosis. The input of the overall model is newly coming historical SCADA data, and the output is health condition of the target wind turbine and which component is defective (if wind turbine is diagnosed as defective).
  Using the same or another data mining algorithm to train different single models applicable for diagnosis and prognosis of different components of wind turbine. The input of the single model is newly coming historical SCADA data, and the output is specific fault details of the defective component including fault type, fault location and fault severity.
  Verifying the effectiveness (e.g. detection rate) of the trained models (both the overall model and the single models) using the collected historical data.
  Note that this step should be done off-line instead of on-line.

Step 203: Using the trained overall model (applicable for wind turbine) to implement wind turbine level diagnosis/prognosis
  Inputting real time newly coming SCADA data to the trained model.
  Running the overall model to implement the embedded algorithm which selected for the overall model.
  Outputting the health index of the detected wind turbine with information incl. whether the wind turbine is normal or defective and if defective which component(s) is defective one(s).
  Note that this step should be done on-line.

Step 204: Using the corresponding trained single model (applicable for corresponding component) to analyze specific fault details of the defective component
  Selecting the trained single model from those ready in Step2 corresponding to the defective component identified in Step3
  Inputting real time newly coming SCADA data to the corresponding trained single model
  Running the single model to implement the embedded algorithm which selected for the corresponding single model
  Outputting the specific fail fault details of the defective component with information incl. fault location, fault type and fault severity
  Note that this step should be done on-line.

The term "on-line" refers to online real time monitor. The term "off-line" refers to offline models training.

Figure 3:
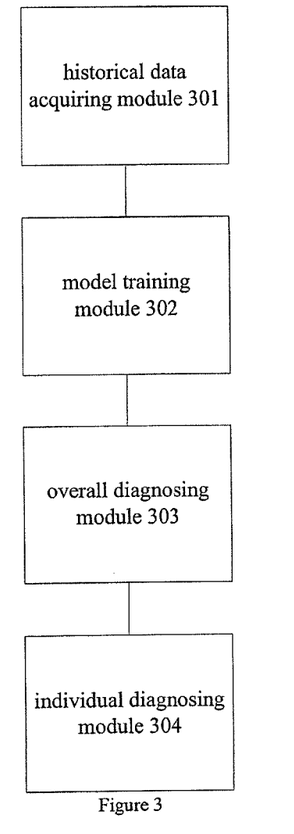
FIG. 3 shows a structural module drawing of a wind turbine condition monitoring system.

FIG. 3 shows a structural module drawing of a wind turbine condition monitoring system, comprising the following modules:
  historical data acquiring module 301, used for acquiring historical SCADA data, and wind turbine reports corresponding to the historical SCADA data, wherein the historical SCADA data covers operation data of the wind turbine, and wherein the wind turbine reports covers: health condition of wind turbine diagnosed as normal or defective status, and defective component with corresponding fault details if health condition of wind turbine is diagnosed as defective status;
  model training module 302, used for training an overall model for overall diagnosing the wind turbine, and training different individual models for analyzing different components of the wind turbine based on the historical SCADA data and the corresponding wind turbine report, by establishing relationship between the historical SCADA data and the wind turbine report;
  overall diagnosing module 303, used for acquiring real time SCADA data, inputting the real time SCADA data to the trained overall model, obtaining the health condition of the wind turbine from the trained overall model, and performing individual diagnosing module if the trained overall model determines wind turbine as defective status;
  individual diagnosing module 304, used for inputting the real time SCADA data to the trained individual model corresponding to the defective component, and obtaining the fault details of the defective component from the trained individual model corresponding to the defective component.

The above-identified embodiments are only used for representing several examples of the present invention, which are illustrated in detail, but shall not be understood to limit the protection scope of the present patent. It should be noted that, several modifications and/or improvements may be made for the skilled in the art, without going beyond the technical concept of the present invention, all of which fall into the protection scope of the present invention. Therefore, the protection scope of the present invention is dependent on the accompanied Claims.

The invention claimed is:

1. A wind turbine condition monitoring method, comprising the following steps:
  historical data acquiring step: acquiring historical SCADA data, and wind turbine reports corresponding to the historical SCADA data, wherein the historical SCADA data covers operation data of the wind turbine, and wherein the wind turbine reports covers: health condition of wind turbine diagnosed as normal or defective status, and defective component with corresponding fault details if health condition of wind turbine is diagnosed as defective status;
model training step: training an overall model for overall diagnosing the wind turbine, and training different individual models for analyzing different components of the wind turbine based on the historical SCADA data and the corresponding turbine report, by establishing relationship between the historical SCADA data and the wind turbine report;
overall diagnosing step: acquiring real time SCADA data, inputting the real time SCADA data to the trained overall model, obtaining the health condition of the wind turbine from the trained overall model, and performing individual diagnosing step if the trained overall model determines wind turbine as defective status;
individual diagnosing step: inputting the real time SCADA data to the trained individual model corresponding to the defective component, and obtaining the fault details of the defective component from the trained individual model corresponding to the defective component;
wherein the model training step comprises:
selecting overall data mining algorithm;
training an overall model for overall diagnosing the wind turbine with the overall data mining algorithm to establish relation between input and output of the overall model, input of the overall model is the historical SCADA data, output of the overall trained model is health condition of the wind turbine which includes normal and defective status, and defective component if health condition of the wind turbine is diagnosed as defective status;
selecting individual data mining algorithms for different components of the wind turbine;
training different individual models for analyzing different components of the wind turbine with the corresponding individual data mining algorithms to establish relation between input and output of the individual model, input of each individual model is the historical SCADA data, output of each individual model if the individual component corresponding to the individual model is defective component.

2. The method according to claim 1, wherein the historical data acquiring step comprises:
acquiring historical SCADA data, and wind turbine reports corresponding to the historical SCADA data, wherein the historical SCADA data covers operation data of the wind turbine, and wherein the wind turbine reports covers: health condition of wind turbine diagnosed as normal or defective status, and defective component with corresponding fault details if health condition of wind turbine is diagnosed as defective status;
verifying the wind turbine report to identify which data section of the historical SCADA data is normal status and which data section of the historical SCADA data is defective status.

3. The method according to claim 1, wherein the model training step comprises:
verifying the effectiveness of the overall model and individual models using the historical SCADA data.

4. The method according to claim 1, wherein the overall diagnosing step comprises:
acquiring real time SCADA data;
inputting the real time SCADA data to the trained overall model;
running the trained overall model to implement the overall data mining algorithm;
obtaining the health condition of the wind turbine from the trained overall model;
performing individual diagnosing step if the trained overall model determines wind turbine as defective status.

5. The method according to claim 1, wherein the individual diagnosing step comprises:
selecting the trained individual model corresponding to the defective component as the trained defective model;
inputting the real time SCADA data to the trained defective model;
running the trained defective model to implement the corresponding individual data mining algorithm;
obtaining the fault details of the defective component from the trained defective model.

6. A wind turbine condition monitoring system, comprising the following modules:
historical data acquiring model, used for acquiring historical SCADA data, and wind turbine reports corresponding to the historical SCADA data, wherein the historical SCADA data covers operation data of the wind turbine, and wherein the wind turbine reports covers: health condition of wind turbine diagnosed as normal or defective status, and defective component with corresponding fault details if health condition of wind turbine is diagnosed as defective status;
model training module, used for training an overall model for overall diagnosing the wind turbine, and training different individual models for analyzing different components of the wind turbine based on the historical SCADA data and the corresponding wind turbine report, by establishing relationship between the historical SCADA data and the wind turbine report;
overall diagnosing module, used for acquiring real time SCADA data, inputting the real time SCADA data to the trained overall model, obtaining the health condition of the wind turbine from the trained overall model, and performing individual diagnosing module if the trained overall model determines wind turbine as defective status;
individual diagnosing module, used for inputting the real time SCADA data to the trained individual model corresponding to the defective component, and obtaining the fault details of the defective component from the trained individual model corresponding to the defective component;
wherein the model training module comprises:
module used for selecting overall data mining algorithm;
module used for training an overall model for overall diagnosing the wind turbine with the overall data mining algorithm to establish relation between input and output of the overall model, input of the overall model is the historical SCADA data, output of the overall trained model is health condition of the wind turbine which includes normal and defective status, and defective component if health condition of the wind turbine is diagnosed as defective status;
module used for selecting individual data mining algorithms for different components of the wind turbine;
module used for training different individual models for analyzing different components of the wind turbine with the corresponding individual data mining algorithms to establish relation between input and output of the individual model, input of each individual model is the historical SCADA data, output of each individual model is the fault details for the individual component corresponding to the individual model if the individual component corresponding to the individual model is defective component.

7. The system according to claim 6, wherein the historical data acquiring module comprises:
module used for acquiring historical SCADA data, and wind turbine reports corresponding to the historical SCADA data, wherein the historical SCADA data covers operation data of the wind turbine, and wherein the wind turbine reports covers: health condition of wind turbine diagnosed as normal or defective status, and defective component with corresponding fault details if health condition of wind turbine is diagnosed as defective status;
module used for verifying the wind turbine report to identify which data section of the historical SCADA data is normal status and which data section of the historical SCADA data is defective status.

8. The system according to claim 6, wherein the model training module comprises:
module used for verifying the effectiveness of the overall model and individual models using the historical SCADA data.

9. The system according to claim 6, wherein the overall diagnosing module comprises:
module used for acquiring real time SCADA data;
module used for inputting the real time SCADA data to the trained overall model;
module used for running the trained overall model to implement the overall data mining algorithm;
module used for obtaining the health condition of the wind turbine from the trained overall model;
module used for performing individual diagnosing module if the trained overall model determines wind turbine as defective status.

10. The system according to claim 6, wherein the individual diagnosing module comprises:
module used for selecting the trained individual model corresponding to the defective component as the trained defective model;
module used for inputting the real time SCADA data to the trained defective model;
module used for running the trained defective model to implement the corresponding individual data mining algorithm;
module used for obtaining the fault details of the defective component from the trained defective model.

11. A wind turbine diagnostic device comprising:
a non-transitory computer readable medium structured to store historical SCADA data, wind turbine reports, and executable instructions comprising:
historical data acquiring step: acquiring historical SCADA data, and wind turbine reports corresponding to the historical SCADA data, wherein the historical SCADA data covers operation data of the wind turbine, and wherein the wind turbine reports covers: health condition of wind turbine diagnosed as normal or defective status, and defective component with corresponding fault details if health condition of wind turbine is diagnosed as defective status;

model training step: training an overall model for overall diagnosing the wind turbine, and training different individual models for analyzing different components of the wind turbine based on the historical SCADA data and the corresponding turbine report, by establishing relationship between the historical SCADA data and the wind turbine report;

overall diagnosing step: acquiring real time SCADA data, inputting the real time SCADA data to the trained overall model, obtaining the health condition of the wind turbine from the trained overall model, and performing individual diagnosing step if the trained overall model determines wind turbine as defective status;

individual diagnosing step: inputting the real time SCADA data to the trained individual model corresponding to the defective component, and obtaining the fault details of the defective component from the trained individual model corresponding to the defective component; and a module processor in operative communication with a SCADA system, a wind turbine controller, and the non-transitory computer readable medium, and configured to execute the instructions stored with the non-transitory computer readable medium;

wherein the model training step comprises:
selecting overall data mining algorithm;
training an overall model for overall diagnosing the wind turbine with the overall data mining algorithm to establish relation between input and output of the overall model, input of the overall model is the historical SCADA data, output of the overall trained model is health condition of the wind turbine which includes normal and defective status, and defective component if health condition of the wind turbine is diagnosed as defective status;

selecting individual data mining algorithms for different components of the wind turbine;

training different individual models for analyzing different components of the wind turbine with the corresponding individual data mining algorithms to establish relation between input and output of the individual model, input of each individual model is the historical SCADA data, output of each individual model if the individual component corresponding to the individual model is defective component.

* * * * *